United States Patent [19]

George et al.

[11] Patent Number: 5,552,674
[45] Date of Patent: Sep. 3, 1996

[54] CLOCKED POWER SUPPLY CIRCUIT WITH AUXILLARY LOAD

[75] Inventors: Tobias George, Wörth am Rhein; Hans-Georg Wolf, Ottersweier/Hatzenweier; Ulrich Schlienz, Lichtenstein, all of Germany

[73] Assignee: Robert Bosch GmbH, Stuttgart, Germany

[21] Appl. No.: 406,865
[22] PCT Filed: Sep. 13, 1993
[86] PCT No.: PCT/DE93/00849
 § 371 Date: Apr. 13, 1995
 § 102(e) Date: Apr. 13, 1995
[87] PCT Pub. No.: WO94/07345
 PCT Pub. Date: Mar. 31, 1994

[30] Foreign Application Priority Data

Sep. 24, 1992 [DE] Germany .................. 42 31 968.4

[51] Int. Cl.⁶ .................................................. H05B 37/00
[52] U.S. Cl. ...................... 315/82; 315/289; 315/DIG. 7
[58] Field of Search .............................. 315/82, 289, 290, 315/307, 291, 185 S, 193, DIG. 7

[56] References Cited

U.S. PATENT DOCUMENTS 4,095,139 6/1978 Symonds et al. ...................... 315/153
4,410,837 10/1983 Suzuki et al. ........................... 315/289
5,046,152 9/1991 Bartscher ............................... 315/307
5,343,125 8/1994 Bernitz et al. .......................... 315/245

FOREIGN PATENT DOCUMENTS

0516377A2 12/1992 European Pat. Off. .

Primary Examiner—Robert Pascal
Assistant Examiner—David Vli
Attorney, Agent, or Firm—Spencer & Frank

[57] ABSTRACT

A clocked power supply circuit is proposed which includes a control arrangement (20) which outputs switching signals (21) to switching means (13) as a function of a load condition present on the output side and which includes at least one inductive element (12). Provided on the output side is a load (22) which is independent of the electric consumer (18), preferably a gas discharge lamp, and is at least temporarily active. It is possible using the load (22) specifically to avoid no-load operation of the clocked power supply by means of a load, as a result of which the system-induced reaction time can be substantially shortened in the case of a short-term energy requirement of the consumer (18). The energy required in the short term can be supplied by the magnetic energy stored in the inductive element (12). The clocked power supply circuit according to the invention is suitable, in particular, for the energy supply of high-pressure gas discharge lamps (18) which are arranged, for example, as headlight lamps in a motor vehicle.

16 Claims, 1 Drawing Sheet

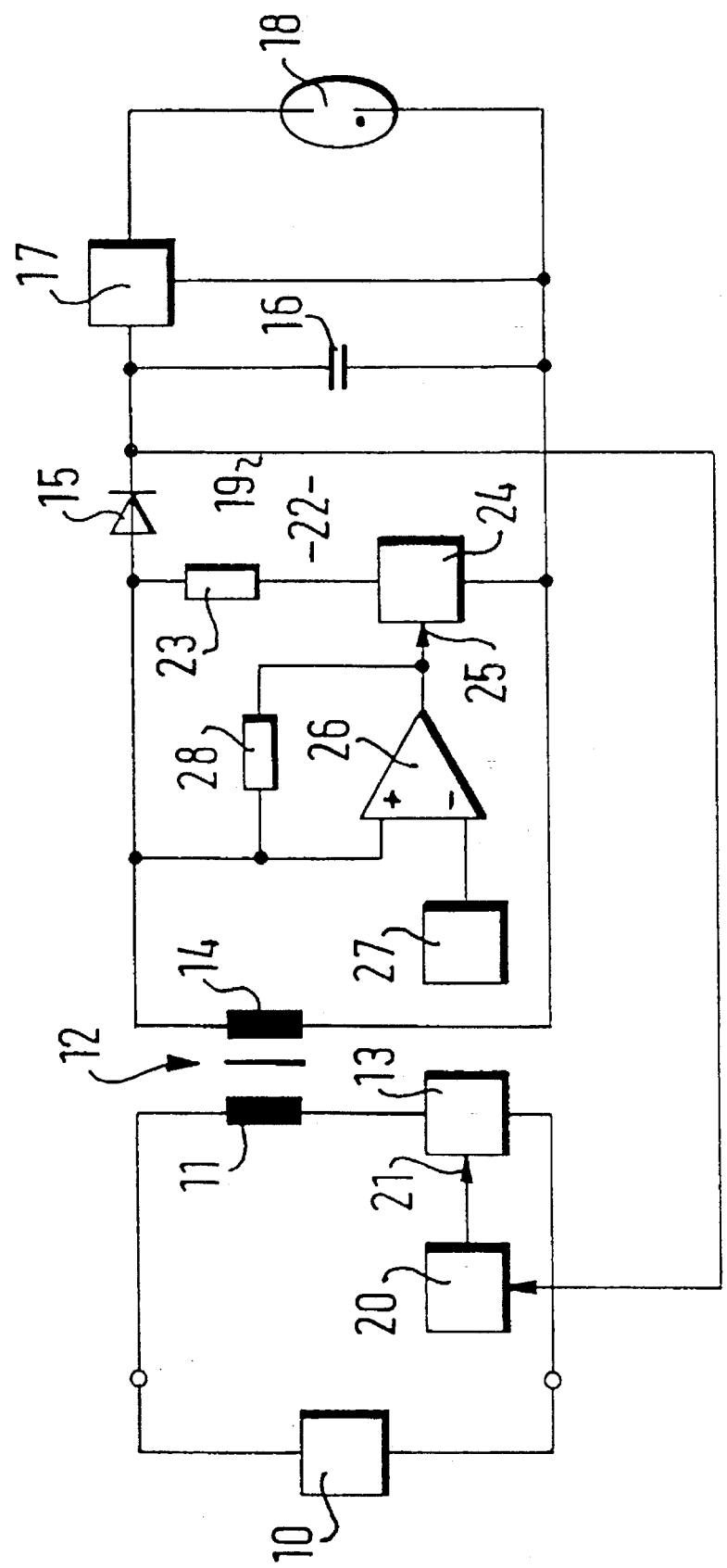

CLOCKED POWER SUPPLY CIRCUIT WITH AUXILLARY LOAD

PRIOR ART

The invention proceeds from a clocked power supply circuit, in particular for the energy supply of gas discharge lamps, which has a control arrangement which provides switching signals for switching means as a function of a load condition present on the output side, and which has at least one inductive element. Exemplary clocked power supply circuits are known from the textbook by U. Tietze and C. H. Schenk, "Halbleiterschaltungstechnik" ("Semiconductor circuit engineering"), 6th Edition, Springer-Verlag 1983, pages 545 to 552, and respectively include at least one inductive element and one control arrangement. The control arrangement provides switching signals for switching means as a function of a load condition present on the output side. The control arrangement is included in a control loop whose task is to keep at least approximately constant the output voltage or the output current of the clocked power supply circuit. The control loop reacts to a change in the load condition with a system-induced settling time. A change in the load condition occurs, in particular, at the instant when electric consumers or loads are switched on. A gas discharge lamp represents a particularly critical load in this respect. In the case of a gas discharge lamp, in particular a high-pressure gas discharge lamp, it is necessary to ensure a rapid supply of energy after the initiation of the ignition process so that the lamp is not immediately extinguished again.

DE-U 901 567 4.9 discloses a clocked power supply circuit which in accordance with a first exemplary embodiment achieves this object by means of a series circuit, provided on the output side, of a capacitor with a coil. The capacitive energy stored in the capacitor ensures a rapid feeding of energy after the initiation of the ignition process of the gas discharge lamp. The coil limits the temporal current variation to a prescribed value and thereby prevents a sudden discharge of the capacitor. The high requirements placed on the coil and on the capacitor both with regard to voltage endurance and permissible maximum current, and also with respect to temporal voltage variation and temporal current variation necessitate the use of high quality components which are correspondingly expensive.

SUMMARY OF THE INVENTION

It is the object of the invention to provide a clocked power supply circuit which renders possible a rapid reaction to a change in the load condition.

The above object is achieved by a clocked power supply circuit, in particular for the energy supply of gas discharge lamps, which has a control arrangement which provides switching signals for switching means as a function of a load condition present on the output side, which has at least one inductive element, and which on the output side, is provided with a further load, in addition to and independent of the primary gas discharge lamp load, which further load, when the gas discharge lamp is turned off, makes available a predetermined load condition for the clocked power supply.

ADVANTAGES OF THE INVENTION

The measure provided according to the invention to provide on the output side of the supply a further load which is independent of the consumer or lamp load and is active at least temporarily renders it possible to store energy in the inductive element of the power supply circuit, with the result that an additional component is eliminated. The stored inductive energy is immediately available when required. The at least temporarily active load renders it possible to operate the power supply circuit independently of the condition of the electric consumer up to full load, thus eliminating a system-induced settling process from no-load operation to full-load operation.

The clocked power supply circuit provided according to the invention is suitable, in particular, for the energy supply of high-pressure gas discharge lamps which after the initiation of the ignition process have a power requirement which is increased with respect to the stationary operating condition, it is necessary to supply the increased power immediately after the initiation of the ignition process.

Advantageous developments and improvements of the clocked power supply circuit according to the invention are additionally described.

An advantageous development provides for the load to become active as a function of the output voltage of the power supply circuit. In this embodiment, the load can be connected and disconnected by means of a comparator, which is preferably assigned a switching hysteresis.

As an example, a transistor, preferably a field effect transistor, which permits both a continuous load connection and a discrete load connection during on and off operation is provided as a load which is at least temporarily active. It is preferable for there to be connected in series with the transistor an ohmic resistance which absorbs the essential portion of the power loss occurring.

Another advantageous embodiment provides as load a limiter diode which, on the one hand, limits the output voltage of the power supply circuit upon overshooting of the threshold voltage and, on the other hand, simultaneously acts as load.

Further advantageous developments and improvements of the clocked power supply circuit according to the invention follow from further subclaims in conjunction with the following description.

BRIEF DESCRIPTION OF THE DRAWING

The drawing shows a circuit diagram of a clocked power supply circuit according to the invention.

DETAILED DESCRIPTION OF THE PREFERRED EMBODIMENT

An energy source 10 is connected to a series circuit which includes a primary winding 11 of a transformer 12 and switching means 13. A secondary winding 14 of the transformer 12 is connected via a rectifier diode 15 to a smoothing capacitor 16. Connected in parallel with the smoothing capacitor 16 is an ignition circuit 17 to which a gas discharge lamp 18 is connected. Connected to the smoothing capacitor 16 is a feedback line 19 which leads to a control arrangement 20 which outputs a switching signal 21 to the switching means 13.

The secondary winding 14 of the transformer 12 is connected to a load 22 which includes a series circuit composed of a resistor 23 with a variable load part 24. The variable load part 24 receives a control signal 25 from a comparator 26 which compares the voltage occurring at the secondary winding 14 with a reference voltage output by a reference voltage source 27. A positive-feedback resistor 28 is assigned to the comparator 26.

The functioning of the clocked power supply circuit according to the invention is explained in more detail with the aid of the circuit diagram shown in the FIGURE:

The transformer 12, the switching means 13, the control arrangement 20, the rectifier diode 15 and the smoothing capacitor 16 are essential components of a flyback converter circuit which provides the basis here, by way of example, as a clocked power supply circuit. The clocked power supply circuit has the task of suitably conditioning the electric energy provided by the energy source 10 for supplying an electric consumer or load 18, here specifically the gas discharge lamp. In many instances, the different voltage level between energy source 10 and load 18 is to be compensated. In the exemplary embodiment shown, the voltage transformation ratio is fixed by the transformation ratio of the transformer 12.

The switching means 13, for example a transistor, preferably a field effect transistor, permits a build up of magnetic energy in the primary winding 11 of the transformer 12 during the conducting phase prescribed by the switching signal 21. The polarity of the secondary winding 14 is selected in such a way that the rectifier diode 15 is blocked during this phase. During the subsequent blocking phase of the switching means 13, the magnetic energy stored in the primary winding 11 is transferred to the secondary winding 14 and, on the output side, is both stored in the smoothing capacitor 16 as capacitive energy and output to the consumer 18. The switching signal 21 is fixed by the control arrangement 20 as a function of the output voltage occurring at the smoothing capacitor 16. If electrical isolation is desired between the output side and input side, an electrical isolation device, for example an optocoupler, can be provided in the feedback line 19 situated between the smoothing capacitor 16 and the control arrangement 20. It is essential that the control arrangement 20 receives information on the current load condition, and as a function thereof fixes, for example, the frequency, preferably however, the mark-to-space ratio of the switching signal 21. The feedback line 19, which is connected in the exemplary embodiment shown to the smoothing capacitor 16 on the output side, can also be connected at the primary winding 11 of the transformer 12 to the output voltage to be prescribed in the case of low accuracy requirements, because during the blocking phase of the switching means 13, the voltage multiplied by the reciprocal of the transformation ratio and occurring at the secondary winding 14 of the transformer 12 can be sensed at the primary winding 11 of the transformer 12.

Provided for the purpose of igniting the gas discharge lamp 18 provided as electric consumer in the exemplary embodiment is the ignition circuit 17 which couples an ignition pulse, for example by means of a transformer, into the supply lead to the gas discharge lamp 18. The ignition circuit 17 is not represented in more detail, because it is of no further importance for the functioning. The ignition circuit 17 can, for example, be caused to output an ignition pulse by means of an external trigger signal. In the exemplary embodiment shown in the FIGURE, after the initial start up of the circuit arrangement the ignition circuit 17 outputs an ignition pulse, for example after a prescribed voltage is reached at the smoothing capacitor 16.

The capacitance of the smoothing capacitor 16 is fixed at a value which ensures satisfactory smoothing of the voltage during steady operation in the gas discharge lamp 18. The capacitive energy stored in the smoothing capacitor 16 is then, however, not sufficient for the increased energy, required a short time after the initiation of the ignition process, for reliably terminating the ignition process of the gas discharge lamp 18, in particular in the case of a high-pressure gas discharge lamp. According to the invention, therefore, provision is made of the at least temporarily active load 22, which ensures that this increased power, which is required short term, can be made available with the required rapidity from the inductive energy stored in the secondary winding 14 of the transformer 12. The load 22 has the task of loading the clocked power supply circuit in such a way that stored inductive energy is available in the at least one inductive element, the transformer 12 in the exemplary embodiment shown, at least when the increased short-term energy requirement exists. This measure replaces by means of the inductive element 12, which is present in any case, further or at least more expensive components which would otherwise have to be provided for energy storage.

In the described exemplary embodiment, the load 22 becomes active as a function of the voltage occurring at the secondary winding 14 of the transformer 12. The comparator 26, for example a specially designed operational amplifier, compares the voltage occurring at the secondary winding 14 with the reference voltage output by the reference voltage source 27. If the voltage occurring at the secondary winding 14 overshoots the reference voltage, the comparator 26 outputs the control signal 25 to the variable load part 24. If, thereafter, the voltage at the secondary winding again undershoots the reference voltage, the control signal 25 is changed again. The positive feedback resistor 28, which gives the comparator 26 a desired hysteresis, is provided for the purpose of avoiding oscillation processes.

The variable load part 24 is, for example, a transistor, preferably a field effect transistor. The transistor is opened or closed by means of the control signal 25 output by the comparator 26. The current flowing through the transistor during the closed phases is limited by the inductance of the secondary winding 14. If a complete short circuiting of the secondary winding 14, in particular with reference to the reaction in the primary circuit, is impossible, it is possible to prescribe the resistor 23 by means of which a further current limitation can be prescribed. Given appropriate design, the resistor 23 can convert almost the entire output power into heat as lost energy. Instead of the switching operation described so far of the variable load part 24 by means of the comparator 26, it is also possible to realize an analog stepless activation of the load 22.

In the exemplary embodiment described, the load 22 always becomes active as a function of the voltage at the secondary winding 14. Idling of the power supply circuit therefore does not occur in this exemplary embodiment. In another embodiment, an external control signal which corresponds to the control signal 25 can be provided instead of the dependence on the output voltage.

In another embodiment, there is connected as load 22 a limiter diode which becomes increasingly more conductive above the prescribed limiting voltage and thus not only limits the voltage but also represents a load on the output side.

The load 22 is decoupled from the smoothing capacitor 16 by means of the rectifier diode 15 whenever the voltage at the load 22 is below the voltage present at the smoothing capacitor 16 plus the diode conducting-state voltage of the rectifier diode 15. The smoothing capacitor 16 is therefore not discharged upon activation of the load 22. On the basis of another type of a clocked power supply circuit, it is readily possible to connect the load 22 directly to the output. The load 22 can likewise be provided in the case of clocked power supply circuits which have an ac voltage output.

We claim:

1. A clocked power supply circuit having: a control arrangement, which provides switching signals for switching means as a function of a load condition present on the output side; at least one inductive element; a gas discharge lamp connected on the output side as a first load; and load circuit means, connected on the output side as a second load which is independent of the gas discharge lamp, for loading the clocked power supply circuit at least prior to and until the gas discharge lamp is ignited and for causing energy to be stored in said inductive element, which energy is directly available to the gas discharge lamp during the ignition process.

2. The clocked power supply circuit as claimed in claim 1, wherein said load circuit means is activated to load said power supply circuit as a function of a voltage occurring on the output side.

3. The clocked power supply circuit as claimed in claim 2, defined by use in a ballast for the energy supply of a high-pressure gas discharge lamp.

4. The clocked power supply circuit a claimed in claim 3, wherein the gas discharge lamp is mounted in a motor vehicle.

5. The clocked power supply circuit as claimed in claim 1, defined by use in a ballast for the energy supply of a high-pressure gas discharge lamp.

6. The clocked power supply circuit as claimed in claim 5, wherein the gas discharge lamp is mounted in a motor vehicle.

7. A clocked power supply circuit as claimed in claim 1 wherein said load circuit means includes a variable impedance element connected in parallel with said gas discharge lamp.

8. The clocked power supply circuit as claimed in claim 7, wherein said load circuit means includes a comparator for comparing a voltage occurring on the output side with a reference voltage output by of a reference voltage source, and for controlling said variable impedance element as a result of the comparison.

9. The clocked power supply circuit as claimed in claim 8, wherein said variable impedance element comprises a transistor, preferably a field effect transistor.

10. The clocked power supply circuit as claimed in claim 9, defined by use in a ballast for the energy supply of a high-pressure gas discharge lamp.

11. The clocked power supply circuit as claimed in claim 10, wherein the gas discharge lamp is mounted in a motor vehicle.

12. The clocked power supply circuit as claimed in claim 9, wherein said load circuit means further includes a resistor for absorbing the power loss connected in series with said transistor.

13. The clocked power supply circuit as claimed in claim 12, defined by use in a ballast for the energy supply of a high-pressure gas discharge lamp.

14. The clocked power supply circuit as claimed in claim 13, wherein the gas discharge lamp is mounted in a motor vehicle.

15. The clocked power supply circuit as claimed in claim 8, defined by use in a ballast for the energy supply of a high-pressure gas discharge lamp.

16. The clocked power supply circuit as claimed in claim 15, wherein the gas discharge lamp is mounted in a motor vehicle.

* * * * *